Patented July 10, 1951

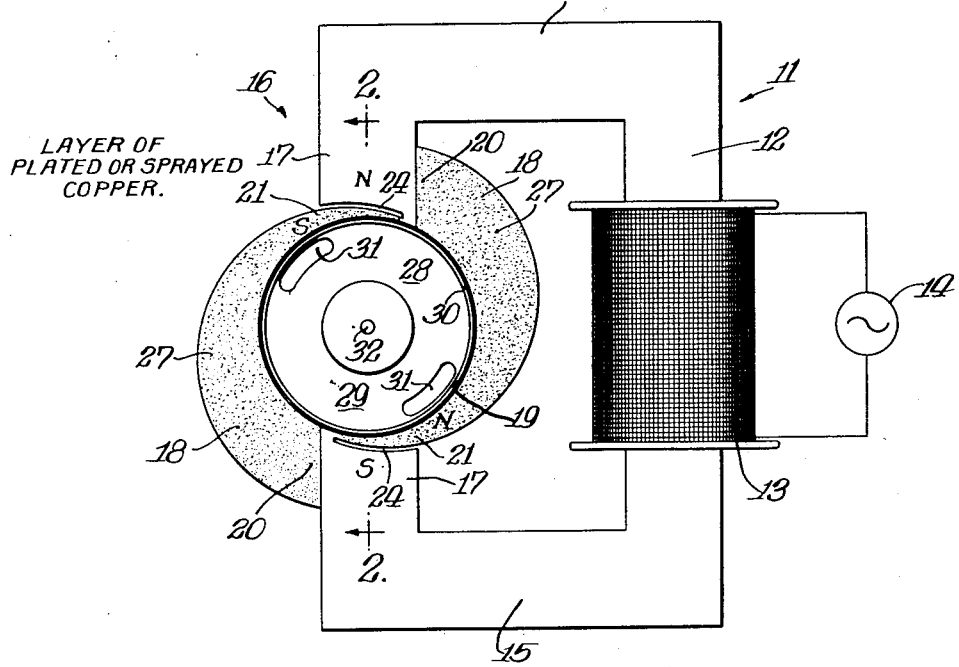
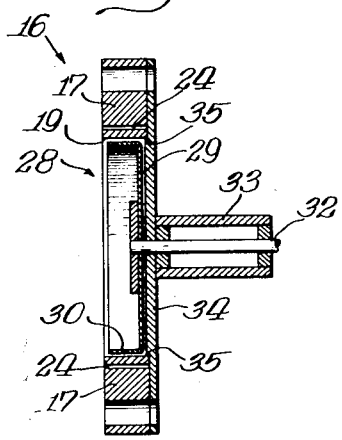
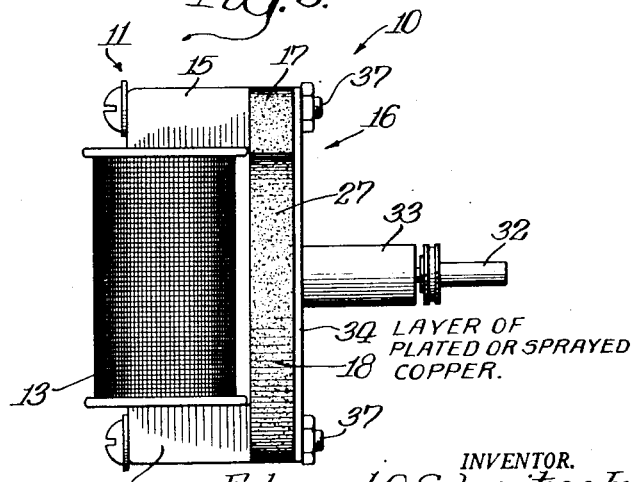

2,559,738

UNITED STATES PATENT OFFICE 2,559,738

SYNCHRONOUS ELECTRIC MOTOR CONSTRUCTION

Edmund O. Schweitzer, Jr., Northbrook, Ill.

Application May 1, 1948, Serial No. 24,587

10 Claims. (Cl. 172—278)

My invention relates, generally, to electric motors, and it has particular relation to synchronous electric motors of the self starting hysteresis type. Also, it constitutes an improvement over the electric motor constructions disclosed in my Patents Nos. 2,187,179, 2,187,180 and 2,265,781.

Among the objects of my present invention are: to increase substantially the starting and running torque of a self starting motor of the hysteresis type; to reduce the losses in such a motor resulting from abrupt changes in the density of the flux generated by the stator; to distribute the flux in a uniform manner between the motor pole members and around the rotor; to provide a gradual transition from flux of one polarity to flux of another polarity in the zones where both act; to provide in a single motor both uniform flux distribution and the gradual transition from flux of one polarity to flux of another polarity; to incorporate shading windings in the stator or a motor having the foregoing characteristics without adversely affecting any of them; and to form a shading winding by electrolytic deposition of a layer of good electrical conducting metal or by other methods which provide a layer or film of good electrical conducting metal around the magnetic circuit.

Other objects of my invention will, in part, be obvious and in part appear hereinafter.

My invention is disclosed in the embodiment thereof shown in the accompanying drawing and it comprises the features of construction, combination of elements and arrangement of parts which will be exemplified in the construction hereinafter set forth and the scope of the application of which will be indicated in the appended claims.

For a more complete understanding of the nature and scope of my invention reference can be had to the following detailed description, taken together with the accompanying drawing, in which:

Figure 1 is a view in diagrammatic form of a hysteresis motor in which my present invention is incorporated;

Figure 2 is a sectional view taken along the line 2—2 of Figure 1; and

Figure 3 is a view, in side elevation, of a motor which has been constructed in which my present invention is embodied.

Referring now particularly to Figure 1 of the drawing, it will be observed that the reference character 10 designates, generally, an electric motor construction which includes a generally C-shaped magnetic core 11 which is preferably formed of laminated silicon steel. The core 11 has a yoke 12 on which a winding 13 is located that, as shown, may be connected for energization to a source 14 of alternating current. The source 14 may be the conventional 60 cycle 110 volt source. The core 11 also includes arms 15 which extend from the yoke 12 for connection to a stator that is indicated, generally, at 16 and is formed preferably of solid steel. For illustrative purposes in Figure 1, the core 11 is shown as being located in the same plane as the stator 16. In Figure 3 and as described hereinafter, the core 11 preferably is located at right angles to the stator 16.

The stator 16 includes pole members 17 from which pole extensions 18 extend toward the other pole member as shown. The pole members 17 and pole extensions 18 define a cylindrical opening 19 having a continuous inner surface. That is, there is no break or air gap in the cylindrical opening 19. One reason for this is to avoid abrupt changes in the magnetic circuit, such as provided by slots, with accompanying abrupt changes in the density of the magnetic flux generated by the stator 16 when the winding 13 is energized with alternating current.

With a view to effecting uniform distribution of the magnetic flux between the pole members 17 the pole extensions 18 are constructed, as shown, with cross sections of gradually decreasing area from a maximum at 20 adjacent each of the pole members 17 to a minimum at 21 adjacent the other pole member 17. Because of the gradually decreasing cross sectional areas of the pole extensions 18 there is a uniform distribution of the magnetic flux around the cylindrical opening 19.

At a particular instant the polarity of the pole members 17 and 18 can be assumed to be as indicated by the letters N-S thereon. At this instant the polarities of the pole extensions 18 are the same although there is some delay in the travel of the flux therealong. Thus, at the instant that the pole members 17 have the polarities indicated, the portions of their extensions 18 also have the same polarities which have been indicated by appropriate letters. Now it will be observed that there are zones adjacent each of the pole members 17 where the polarities are opposite or, expressed differently, there is a substantial out of phase relationship between the flux of the pole members 17 and the flux of the adjacent portion of the pole extensions 18 from the other pole members. There is then an abrupt change in the flux from one zone to the other.

With a view to avoiding this sudden change in polarity of the fluxes or their out of phase relationship I provide slots or air gaps 24 in the pole members 17 which, in effect, extend the pole extensions 18 so that, instead of terminating adjacent the edges of the pole members 17, they actually terminate at points beyond their central portions or beyond the centers of the magnetic poles of the pole members 17. This construction employing the slots or air gaps 24 causes a smooth transition from the zone of one flux polarity to the zone of the opposite flux polarity with corresponding improvement in the uniformity of the flux distribution around the cylindrical opening 19.

As indicated hereinbefore, there is a slight time lag in the flow of the magnetic flux through the pole extensions 18. In order to increase further this time delay or lag in the shifting of the magnetic flux around the pole extensions 18 and around the cylindrical opening 19, I have provided shading means or windings around the pole extensions 18. These shading means or windings are in the form of layers 27 of copper which may be electrolytically deposited or sprayed on the pole extensions 18. Other good conducting metals, such as silver, which can be electrolytically deposited or sprayed, can be employed if desired. In the particular construction shown in the drawings a layer having a thickness of .008 inch was employed, the layer being formed of copper.

The construction of the stator 16, as just described, with the pole extensions 18 of gradually decreasing cross section, with the slots or air gaps 24 in the pole members 17 and with the electrolytically deposited layers 27 of metal around the pole extensions 18, is effective to generate a magnetic field around the cylindrical opening 19 which is uniform in density and which shifts or rotates therearound. This magnetic field can be employed in conjunction with rotors of various types for operating the same at a speed which, if desired, may be a synchronous speed with respect to the frequency of the source 14 of alternating current.

For example, a rotor 28 can be employed for operating in the rotating magnetic field of uniform flux density generated by the stator 16. The rotor 28 includes a disc 29 having a rim 30 both formed of hardened steel. The disc 29 has circular slots 31 to provide a bipolar effect so that, when the source 14 is a 60 cycle source, the rotor 28 will run at a speed of 3600 R. P. M. The rotor 28 is mounted on a shaft 32 which, as shown in Figures 2 and 3 of the drawing, is journaled in a bearing 33. The bearing 33 is carried by a strap 34 of non-magnetic material such as brass having shoulders 35 near the ends interfitting with the stator 16 for centering the bearing 33 and shaft 32.

As illustrated in Figure 3 of the drawing the magnetic core 11 may be positioned at right angles to the stator 17 and may be held in place thereon by bolts 37 which also hold the bearing strap 34 in position.

With a view to demonstrating the advantages of the use of the stator 16 employing the slots or air gaps 24 and the shading windings provided by the layers 27 of electrolytically deposited metal either singly or in combination the following data are set forth. In obtaining these data a stator having a thickness of $\frac{1}{16}$ inch and a rotor having a diameter of 1½ inches were used with a ten watt input to the winding 13.

| ounce inch torque | Motor Construction |
|---|---|
| .025 | stator as shown without plated shading windings and without slots. |
| .050 | stator as shown without plated shading windings but with slots. |
| .100 | stator as shown with plated shading windings and with slots. |

From the foregoing data it will be apparent that the torque of the motor construction 10 is increased greatly by the use of the slots or air gaps 24 and also by the use of the shading windings provided by the layers 27 of electrolytically deposited metal. Both of these features can be provided without in any way interrupting the continuous surface of the cylindrical opening 19 in which the rotor 28 operates. Because of these constructional features in which abrupt changes in density of the magnetic flux around the surface 19 are not present, undesirable hysteresis loss in the rotor 28 is avoided together with the accompanying drag on the same which, when present, reduces the available torque output of the motor.

The following data were obtained using a stator 16 having a thickness of ¼ inch and a rotor having a diameter of 1⅛ inches, and employing the slots or air gaps 24, and shading windings provided by layers 27 of electrolytically deposited metal either singly or in combination with a five watt input to the winding 13:

| Start | Millimeter grams torque | | Motor Construction |
|---|---|---|---|
| | Synchronous pull in | Synchronous pull out | |
| 12.10 | 19.8 | 28.6 | stator as shown without shading windings and without slots. |
| 24.2 | 26.4 | 28.6 | stator as shown without slots and with .004 inch plating. |
| 33.0 | 22.0 | 24.2 | stator as shown without slots and with .008 inch plating. |
| 44.0 | 30.8 | 35.2 | stator as shown with slots and with .008 inch plating. |

The foregoing data show that there is an optimum thickness of the layers 27 of electrically conducting material forming the shading windings. For the construction specified this thickness appears to range from about .003 to about .006 inch in order to obtain maximum synchronous pull in and pull out torque.

The term "shading winding," as employed herein, is intended to include a layer of electrically conducting metal, such as copper or silver, that is uniformly distributed over the surface of the magnetic circuit in the form of minute particles by electrolytic deposition, spraying or the like.

Since certain changes can be made in the foregoing motor construction and different embodiments of the invention can be made without departing from the spirit and scope thereof, it is intended that all matter shown in the accompanying drawing and described hereinbefore shall be interpreted as illustrative and not in a limiting sense.

I claim as my invention:

1. A self starting single phase alternating current motor comprising, in combination, a generally C-shaped laminated magnetic core, a winding on said core for energization from a source of alternating current, a one piece stator of magnetic material having a pair of pole members engaging and constituting extensions of the ends of said C-shaped core, and a polar projection extending from each pole member to the other and integral with both and together defining a cylindrical opening having a continuous surface, each pole member being coextensive with a minor portion of said cylindrical opening and each polar projection spanning the principal portion of the space individual thereto between said pole members, each polar projection extending beyond the edge of the other pole member and separated therefrom by a gap to merge the out of phase fluxes and effect a gradual transition therebetween; and a rotor of magnetic material mounted for rotation in said opening.

2. A self starting single phase alternating current motor comprising, in combination; a stator including a pair of magnetic pole members, a core of magnetic material extending between said pole members, a winding on said core for energization from a source of alternating current, and a polar projection extending from each pole member to the other and integral with both and together defining a cylindrical opening having a continuous surface, the cross sectional area of each polar projection decreasing gradually and uninterruptedly from a maximum adjacent the pole member from which it extends to a minimum adjacent the other pole member to distribute the flux around said cylindrical opening and each polar projection extending beyond the edge of the other pole member and separated therefrom by a gap to merge the out of phase fluxes and effect a gradual transition therebetween, each pole member being coextensive with a minor portion of said cylindrical opening and each polar projection spanning the principal portion of the space individual thereto between said pole members; and a rotor of magnetic material mounted for rotation in said opening.

3. A self starting single phase alternating current motor comprising, in combination; a stator including a pair of magnetic pole members, a core of magnetic material extending between said pole members, a winding on said core for energization from a source of alternating current, a polar projection extending from each pole member to the other and integral with both and together defining a cylindrical opening having a continuous surface, each polar projection joining the other pole member at a position on the inner side thereof spaced from its edge facing said polar projection to merge the out of phase fluxes and effect a gradual transition therebetween, and a layer of electrolytically deposited metal overlying each polar projection into which eddy currents are induced to distribute the flux there along and thereby increase the motor torque; and a rotor of magnetic material mounted for rotation in said opening.

4. A self starting single phase alternating current motor comprising, in combination; a stator including a pair of magnetic pole members, a core of magnetic material extending between said pole members, a winding on said core for energization from a source of alternating current, a polar projection extending from each pole member to the other and integral with both and together defining a cylindrical opening having a continuous surface, the cross sectional area of each polar projection decreasing gradually from a maximum adjacent the pole member from which it extends to a minimum adjacent the other pole member to distribute the flux around said cylindrical opening and each polar projection joining the other pole member at a position on the inner side thereof spaced from its edge facing said polar projection to merge the out of phase fluxes and effect a gradual transition therebetween, and a layer of electrolytically deposited metal overlying each polar projection into which eddy currents are induced to distribute the flux there along and thereby increase the motor torque; and a rotor of magnetic material mounted for rotation in said opening.

5. A self starting single phase alternating current motor comprising, in combination; a stator including a pair of magnetic pole members, a core of magnetic material extending between said pole members, a winding on said core for energization from a source of alternating current, a polar projection extending from each pole member to the other and integral with both and together defining a cylindrical opening having a continuous surface, and a layer of electrolytically deposited metal overlying each polar projection into which eddy currents are induced to distribute the flux there along and thereby increase the motor torque; and a rotor of magnetic material mounted for rotation in said opening.

6. A self starting single phase alternating current motor comprising, in combination; a stator including a pair of magnetic pole members, a core of magnetic material extending between said pole members, a winding on said core for energization from a source of alternating current, a polar projection extending from each pole member to the other and integral with both and together defining a cylindrical opening having a continuous surface, each pole member being coextensive with a minor portion of said cylindrical opening and each polar projection spanning the principal portion of the space individual thereto between said pole members, the cross sectional area of each polar projection decreasing gradually from a maximum adjacent the pole member from which it extends to a minimum adjacent the other pole member to distribute the flux around said cylindrical opening, and a layer of good electrical conducting material overlying each polar projection into which eddy currents are induced for delaying the shifting of the magnetic flux there along; and a rotor of magnetic material mounted for rotation in said opening.

7. A self starting single phase alternating current motor comprising, in combination; a stator including a pair of magnetic pole members, a core of magnetic material extending between said pole members, a winding on said core for energization from a source of alternating current, a polar projection extending from each pole member to the other and integral with both and together defining a cylindrical opening having a continuous surface, the cross sectional area of each polar projection decreasing gradually from a maximum adjacent the pole member from which it extends to a minimum adjacent the other pole member, and a layer of electrolytically deposited metal overlying each polar projection into which eddy currents are induced, the combination of said polar projections of gradually decreasing cross sectional area and said layer of electrolytically deposited metal effecting uniformity in flux distribution and increase in motor torque; and a rotor of magnetic material mounted for rotation in said opening.

8. A self starting single phase alternating current motor comprising, in combination, a generally C-shaped laminated magnetic core, a winding on said core for energization from a source of alternating current, a one piece stator of magnetic material at right angles to said C-shaped magnetic core and having a pair of pole members engaging and constituting extensions of the ends of said C-shaped core, a polar projection extending from each pole member to the other and integral with both and together defining a generally cylindrical opening, a relatively thin layer of good electrical conducting material overlying each polar projection throughout substantially the entire length thereof into which eddy currents are induced for delaying the shifting of the magnetic flux there along, and a rotor of magnetic material mounted for rotation in said opening.

9. An electric motor comprising, in combination, a rotor, a magnetic core structure including a pair of pole members in cooperative relation to said rotor, a winding on said core structure for energization from a source of alternating current, a polar projection extending around said rotor from each pole member toward the other, and a layer of electrolytically deposited metal overlying each polar projection and constituting a shading winding therefor.

10. An electric motor comprising, in combination, a rotor, a magnetic core structure including a pair of pole members in cooperative relation to said rotor, a winding on said core structure for energization from a source of alternating current, a polar projection extending around said rotor from each pole member to the other, each polar projection being integral with the other pole member and extending beyond the edge thereof and separated therefrom by a gap to merge the out of phase fluxes and effect a gradual transition therebetween, each pole member being coextensive with a minor portion of the periphery of said rotor and each polar projection spanning the principal portion of the space individual thereto between said pole members, and a layer of good electrical conducting material overlying each polar projection and constituting a shading winding therefor.

EDMUND O. SCHWEITZER, Jr.

REFERENCES CITED

The following references are of record in the file of this patent:

UNITED STATES PATENTS

| Number | Name | Date |
|---|---|---|
| 1,823,601 | Hansen et al. | Sept. 15, 1931 |
| 1,952,220 | Price | Mar. 27, 1934 |
| 1,992,956 | Lilja | Mar. 5, 1935 |
| 1,992,971 | Stewart | Mar. 5, 1935 |
| 2,020,090 | Weed | Nov. 5, 1935 |
| 2,084,590 | O'Leary | June 22, 1937 |
| 2,265,781 | Schweitzer | Dec. 9, 1941 |
| 2,284,395 | Kohlhagen | May 26, 1942 |
| 2,454,026 | Bacon | Nov. 16, 1948 |
| 2,454,589 | Ballentine | Nov. 23, 1948 |
| 2,487,258 | Morris | Nov. 8, 1949 |

FOREIGN PATENTS

| Number | Country | Date |
|---|---|---|
| 1,480 | Great Britain | Of 1889 |
| 576,249 | Great Britain | Mar. 26, 1946 |